Dec. 30, 1958   L. R. PADBERG, JR   2,866,512
METHOD OF SUBSURFACE EXPLORATION BY SONIC MEANS
Filed July 3, 1953   5 Sheets-Sheet 1

INVENTOR.
LOUIS R. PADBERG, JR.
BY George Sipkin
George E. Pearson
ATTORNEYS

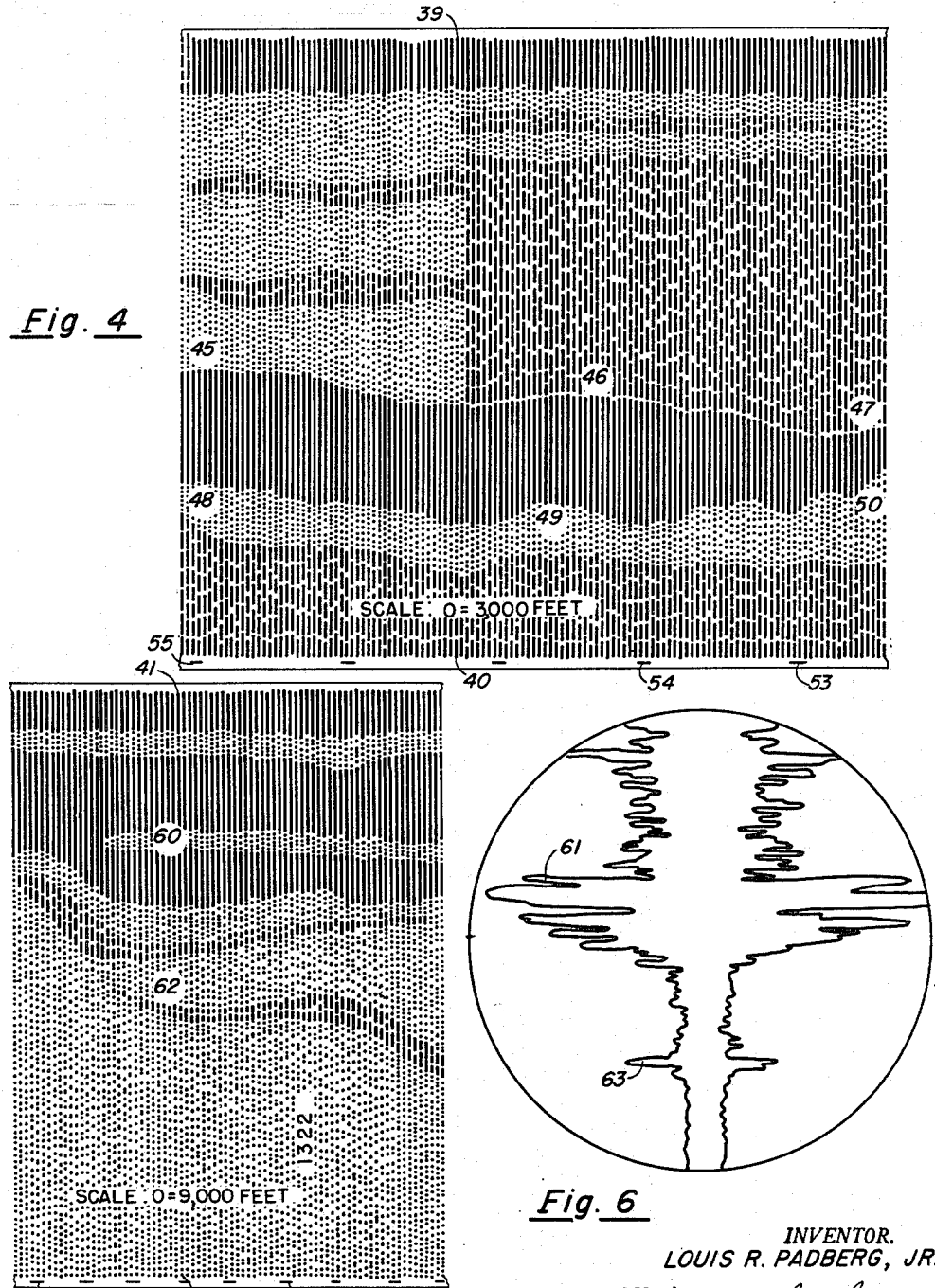

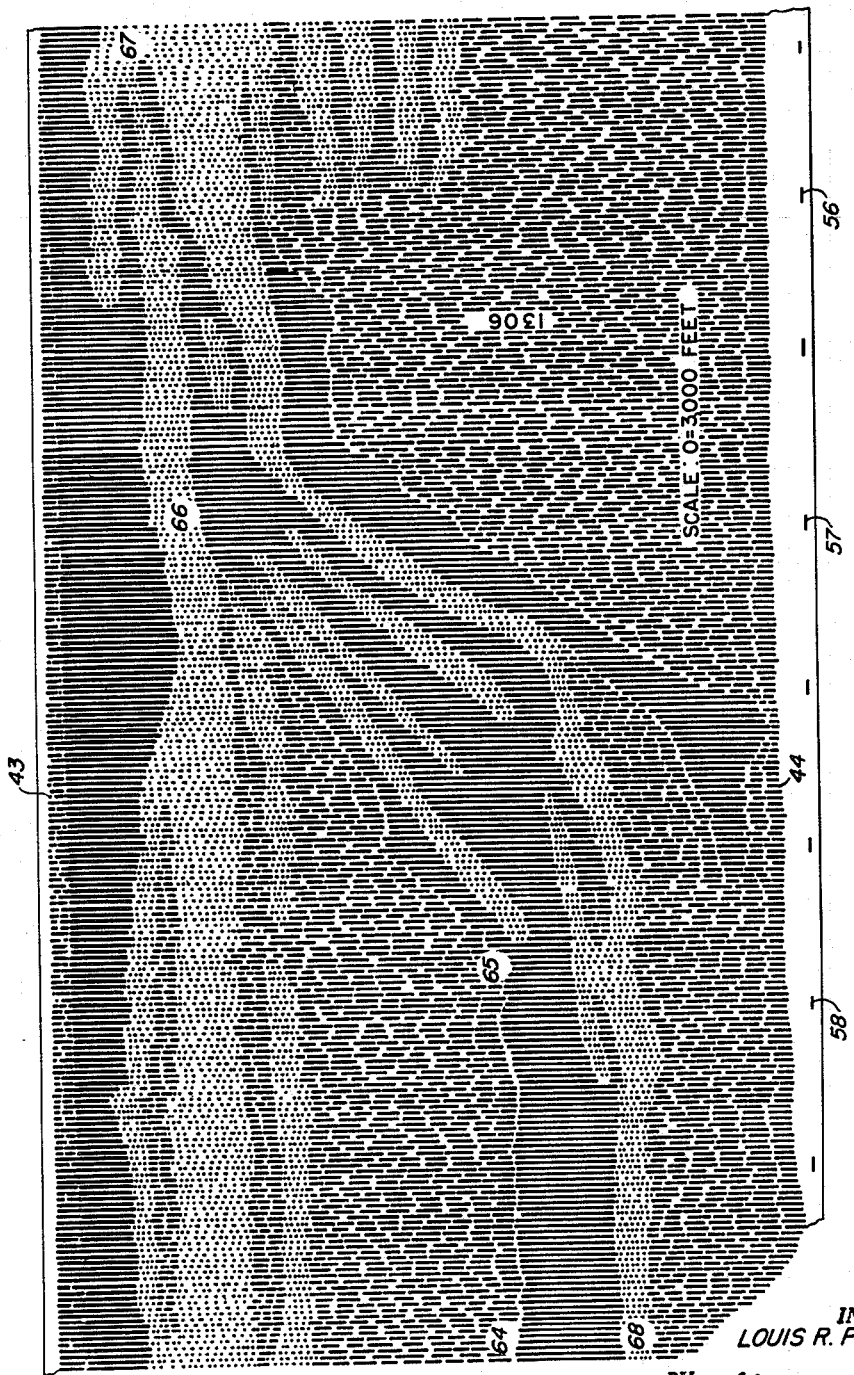

Patented Dec. 30, 1958

2,866,512

METHOD OF SUBSURFACE EXPLORATION BY SONIC MEANS

Louis R. Padberg, Jr., San Diego, Calif.

Application July 3, 1953, Serial No. 366,079

19 Claims. (Cl. 181—.5)

(Granted under Title 35, U. S. Code (1952), sec. 266)

The invention described herein may be manufactured and used by or for the Government of the United States of America for governmental purposes without the payment of any royalties thereon or therefor.

This invention relates generally to the art of conducting subsurface explorations or surveys on land or water and more particularly to a new and improved method of subsurface exploration wherein sonic means and associated apparatus is employed to produce and record echos indicative of the contour, depth and density of subsurface water or land structures. The term "subsurface" as employed herein refers either to that which is beneath the land surface of the earth or the surface of the waters thereover.

Subsurface explorations may be in the nature of geophysical or seismological explorations wherein the geological structure of the subsurface is surveyed for the purpose of locating sedimentary deposits containing valuable minerals or for locating geological anomalies such as anti-clines, synclines, faults, dikes, sills, and the like structures which are useful in determining locations favorable to the formation of petroleum products.

Several methods have been employed heretofore for determining the subsurface strata. According to one such method known as the seismic method by transient excitation, explosives are detonated at or near the surface of the earth to set up earth vibrations which are returned to the earth's surface after being affected variably by different geological strata and changes in density of the earth structures. Seismograms of the returned vibrations or waves are produced, and the information provided thereon is analyzed and utilized for the purpose of deducing and plotting the geological structure thus surveyed.

The method of transient excitation while providing satisfactory results under certain conditions of use has not been found to be entirely satisfactory in service for the reasons that explosives are dangerous to handle, cause deformation of the earth in the vicinity of the explosion, and scatter the explosive energy in many unwanted directions; many frequencies are present in the resulting discharge which produce differences in response of the receiving equipment and different degrees of absorption, reflection, and refraction of the wave energy in traversing different earth materials; and the process of exploring a large area is tedious and time consuming.

Another prior art method of seismological exploration provides for the generation of seismic waves by continuous and periodic excitation of the earth by means of a vibrator, or the like, and the study of the earth response thereto in relation to the frequency of the seismic waves thus excited. Certain characteristic frequencies corresponding to resonant conditions of the earth are obtained, and yield important information regarding the geological structure to be determined. The measurability of the seismic waves by this method, however, depends upon a satisfactory signal to noise ratio, the noise being due to microseisms, and requires the use of very large and cumbersome vibrators or extremely sharp filters.

Subsurface explorations may also be in the nature of oceanographic surveys for measuring and portraying depth of sea water and sediment, contour variations in the ocean floor and strata therebeneath, and for locating scattering layers, water masses, fish, and the like. For this purpose, conventional echo sounders have been used heretofore with some degree of success. These echo sounders, however, usually use power inputs of only a few watts and, at best, are able to penetrate only a few feet of bottom sediments and, in some cases, cannot produce any echo at all if the bottom material is very soft. Echo sounders also usually operate above the aural spectrum where attenuation losses are very high. Moreover, the conventional recording techniques employed are such that bottom slopes are greatly exaggerated.

In accordance with the subsurface exploration method of the present invention, which follows certain well established principles of echo sounding, short pulses of acoustic energy at extremely high pressure levels approaching those of explosives, but at a single discrete frequency in the aural spectrum, are generated and transmitted to the earth in a vertically directed or projected, concentrated beam. The use of the proper frequency and the high level of acoustic energy permits pulse penetration of subsurface structures at great depths heretofore deemed not possible.

The projected pulses penetrate the land surfaces of the earth or the ocean floor and the strata therebeneath to produce successive echos of variable intensity indicative respectively of the contour, depth and density of the subsurface water or land structures or strata upon passage of the pulsed energy therethrough as the penetration progresses.

The present invention also has provision for repeating the pulses of energy at a predetermined rate controllable at will and for accurately timing and recording the returned echoes to provide a continuous permanent record of variations in the subsurface structure as the apparatus is moved along a predetermined traverse. When the traverse is along an ocean course, for example, the resulting record provides an easy to interpret picture in profile of the ocean floor, of its depth, contour and thickness of sediment, of the sea life and water masses above it, and of the strata therebeneath, in some cases to a great depth, much in the same manner as the eye would see it in moving from point to point along the traverse.

The echo information thus provided as a continuous record is additionally presented in aural form and also in visible form as a trace on the face of a cathode ray tube. The aural and trace displays depict only those echoes produced by discrete pulses individual thereto and therefore provide a check or means of comparing the information thus received with that concurrently being indicated on the continuous record. Recordings may also be made of the aural and trace displays for use in subsequent analysis of the continuous record, correlating marks or indicia means being carried by each to identify the discrete pulse corresponding thereto.

The projector employed to transmit the pulses may also be used as the receiving element for the returned echoes or, in some cases, the receiver may be in the form, for example, of geophones in an array, use being made of both reflected and refracted waves. Although particularly well suited for use where there is water over the underlying strata, the method of the present invention is adaptable for use over land, particularly over moist earth or swamp land. In applications to dry earth, fluid is employed to increase the coupling between the earth and the projector.

Generation and transmission of the high level acoustic energy at a single discrete frequency in the aural spectrum requires use of only simple filtering in the echo receiving system employed in practicing the present invention with the result that a greatly improved signal to noise ratio is obtained therefrom.

An object of the present invention is to provide a new and improved method for conducting subsurface explorations on land or water.

Another object is to provide a completely repetitive method of subsurface exploration which is safe, economical, rapid, and provides an easy to interpret picture of subsurface structures in continuous form such as would be seen by eye in moving from point to point.

Another object is to provide a new and improved method for locating geological anomalies indicative of locations favorable to the formation of petroleum products.

Another object resides in the provision of a new and improved method for locating sedimentary deposits on the ocean floor and measuring the depth thereof.

A further object is to provide a new and improved method for portraying scattering layers, water masses, fish, and the like objects within the ocean water, and contours of the ocean floor and the strata therebeneath to great depth in the form of a permanent record which is easy to read and interpret.

A still further object is to provide a new and improved method for locating subsurface strata on dry land or in swamp areas.

An additional object is to provide a new and improved method and apparatus for generating and transmitting energy to the earth in a concentrated beam, at a single discrete frequency, at levels approaching those of explosives, and without causing deformation of the earth in the area traversed by the beam.

Still another object is to provide a new and improved sonic method for generating and projecting acoustic energy in short pulses at extremely high levels into the subsurface for penetration thereof to greath depths.

Yet another object resides in the provision of a sonic method as aforedescribed having further provision for the accurate timing and recording of the returned echoes in a manner indicative of successive subsurface structures traversed by each of the pulses upon progressive penetration thereof through the subsurface.

Other objects and many of the attendant advantages of this invention will be readily appreciated as the same becomes better understood by reference to the following detailed description when considered in connection with the accompanying drawings wherein.

Figure 1:
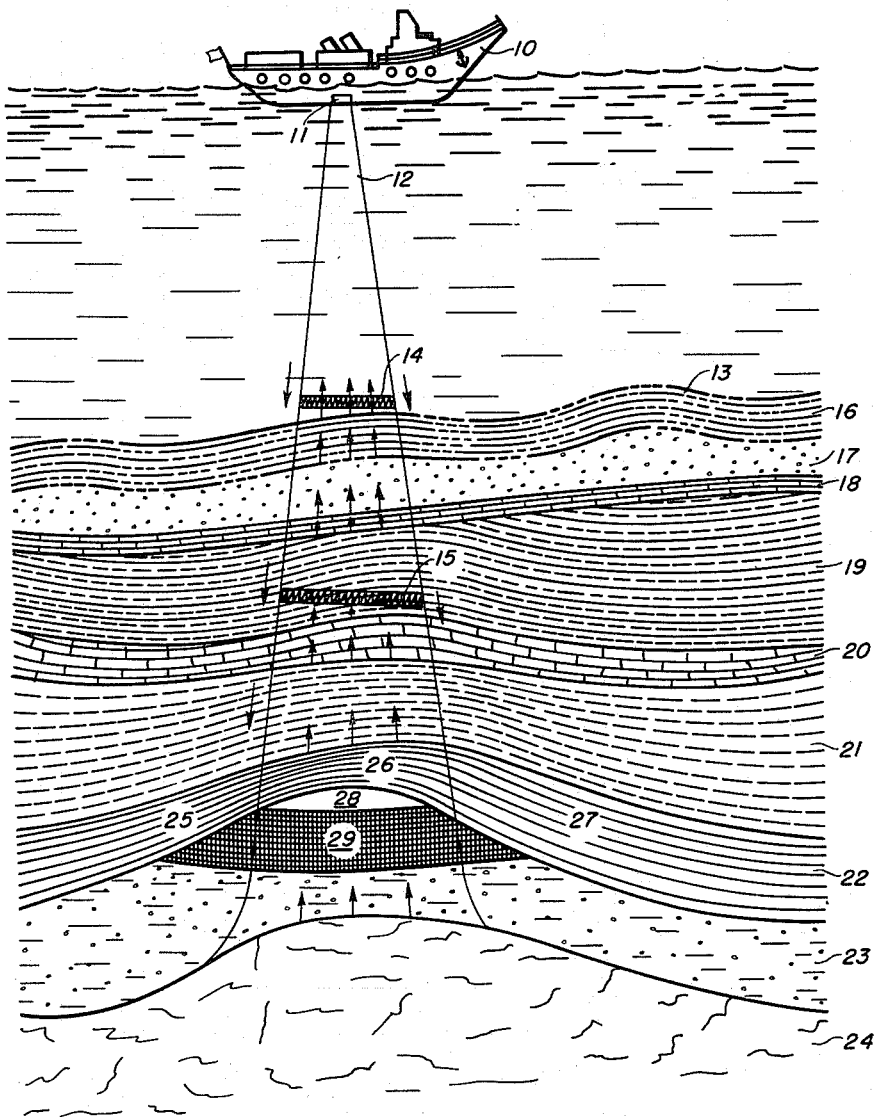
Fig. 1 is a diagrammatic view portraying the manner of practicing the subsurface exploration method of the present invention over a body of water such as the ocean.

Figs. 4, 4a, and 5 depict portions of the continuous record obtained in conducting subsurface explorations in accordance with the method of the present invention; and Fig. 6 depicts an oscillogram of returned echoes developed in accordance with the method of the present invention.

The subsurface exploration method of the present invention contemplates penetration of sonic pulses to great depths, heretofore impossible to obtain, of the order of thousands of feet below the earth's crust. For this to be successfully accomplished, high power, short pulses, low frequency, and directivity of the pulsed beam must be observed. These are basic interrelated parameters, all of which are critical.

Low frequency

It has been known for years that transmission losses of sonic energy through water decrease as the frequency is lowered. It has been suspected that transmission losses through bottom material also decrease as the frequency is lowered although this has not been proven as heretofore it has not been possible to develop a low frequency sound source which had sufficient power to make the measurements. Low frequency is therefore a critical parameter and must be sufficiently low to minimize transmission losses and thereby permit penetration to great depths of the order of thousands of feet. The term low frequency means frequencies within the aural spectrum which covers the range of the human ear as distinguished from those in the region above audibility. The human ear normally has a response between 30 and 16,000 cycles per second.

High power

Except for explosives, there heretofore has been no known sound source that could project high acoustic power at low frequencies. Efficiencies were of the order of less than 1%. Since high pressure levels are necessary at low frequencies to penetrate sediments, bottom materials, substrata, and other subsurface earth structures, and since explosives heretofore were the only means for providing the required high power levels, explosives were adopted as power sources in conventional seismic surveys. The power level obtainable from an explosive depends upon the size of the charge and its chemical composition and other factors. The frequencies present cover almost the whole audible spectrum. The pressure level at any one frequency is uncertain and extremely difficult to measure because an explosive radiates energy in all directions. A 2 pound charge of TNT and the apparatus hereinafter to be described for practicing the present sonic method give comparable results when the apparatus is operated at its preferred frequency. High power is therefore a critical parameter and must be sufficiently high at low frequency to provide penetration of earth structure to greath depth of the order of thousands of feet. By high power is meant an electrical power input to an acoustic transducer projector of the order of upwards to 100,000 watts.

Short pulse

In practice it has been found that after a critical amount of electrical power input is applied to an acoustic transducer projector, a point is reached where bubbles are formed in front of the projector and the projector face becomes separated from the water it is trying to push. Technically, this point is known in the art as the point of cavitation. As disclosed, for example, in Patent No. 2,436,377, issued February 24, 1948, to H. B. Briggs et al. for Ultrasonic Compressional Wave Transmission, compressional waves may be transmitted at high power by using pulses of such short duration that cavitation is avoided, the periods of high power transmission being limited to values less than the delay time in the establishment of cavitation. Short pulse is therefore a critical parameter and the electrical energy input pulse to the projector must be sufficiently short to avoid cavitation at the power levels required to penetrate earth structures to the desired depths as aforestated. By short pulse is meant a pulse of electrical energy having a time duration of the order of less than 10.0 milliseconds.

Directivity

The amount of energy reflected from a target is dependent upon how much energy strikes it. In the case of explosives, the initial energy may be many times greater than that generated by a particular sound source, but this energy is almost all wasted in unwanted directions because it has no directivity. As a result, reflections are returned from many directions other than the desired direction thus complicating the interpretation of results. In the sonic method of the present invention, the energy is projected in a narrow concentrated beam and thus goes out only in the desired direction so that the amount of energy seen by the target even at great depth may equal or exceed the power level produced at the target by an explosive. The beam is concentrated in the desired direction and therefore unwanted and spurious echoes from unwanted directions are avoided, which unwanted echoes, if received, would only complicate interpretation of results.

Directivity is therefore a critical parameter and the beam must be sufficiently narrow to concentrate the pulsed energy for high resolution of target illumination at great depth; to minimize spurious echoes from unwanted directions; and to provide directivity compatible with high power, low frequency, and practical consideration as to size of the projector. By narrow beam is meant a beam having a projection angle of the order of 15 degrees.

The method of subsurface exploration of the present invention is particularly well suited for use in conducting geophysical or oceanographic surveys at sea as illustrated in Fig. 1 wherein there is shown a vessel 10 having a projector-receiver 11 arranged to project a beam 12 of high power short pulses vertically into the water just below the surface thereof.

It will be understood that any suitable mounting arrangement for the projector-receiver may be employed. In some cases, for example, it may be desirable to build the projector-receiver permanently into the hull of the vessel as indicated schematically in Fig. 1; or, in other cases, it may be more advantageous to us an over-the-side mounting arrangement in which means adjustable at will from the deck of the vessel may be employed to position the projector-receiver adjustably for vertical transmission of the pulses therefrom.

The pulse beam 12 preferably is narrow and conical, having a projection angle of the order of 15 degrees; i. e., the angle subtended by the beam is approximately 15 degrees. The acoustic energy in the beam is that which results from a source of energy preferably at a high level of the order of 100 kilowatts and at a low frequency preferably below 15 kilocycles whereby each of the pulses penetrates the ocean floor 13 and progressively penetrates the strata therebeneath to great depth, progressive positions of penetration of a pulse being shown diagrammatically at 14 and 15 and the strata illustrated being identified respectively as layers of sediment 16, sand 17, limestone 18, sandy clay 19, limestone 20, shale 21, shale 22, concentrated salt water 23, and rock 24. As the pulsed energy traverses the different strata, echoes are returned therefrom which vary in intensity and duration in accordance with the density and thickness of the strata. The returning echoes and the sound reflecting strata are indicated by the upwardly directed arrows.

The lapse of time between the transmission of a pulse and the return of a particular echo therefrom provides a measure of depth of the ocean, for example, when the particular echo has been reflected from the ocean floor, or provides a measure of pulse penetration therebeneath when the particular echo is one which has been reflected from a geological structure or strata marking a distinct change in density of earth materials beneath the ocean floor. Thus, as the vessel moves along a predetermined traverse and the pulses are transmitted repetitively at a predetermined repetition rate, the variations in the time of return of the echoes provide a measure of the contour variations of the sea bottom and of the substrata structures therebeneath, and recordings of these variations, hereinafter to be described, provide a picture in profile of the bottom and substrata contours much in the same manner as the eye would see them in moving from point to point along the traverse or as they appear, for example, in Fig. 1.

The record of strata contours provides useful information indicative, for example, of geological structures such as the anti-cline indicated at 25—26—27. Such structure usually is favorable to the formation of petroleum products and frequently has associated therewith a gas pocket, illustrated at 28, and an oil bed illustrated at 29.

Any apparatus capable of developing high power short pulses of acoustic energy at the required level and low frequency, as aforementioned, and capable further of recording the returned echoes in the manner hereinafter to be described, may successfully be employed to practice the method of subsurface exploration of the present invention. The apparatus, however, preferably is of the type described and claimed in the copending application of Louis R. Padberg, Jr., et al., for Improved Echo Ranging System, Serial No. 504,390, filed April 27, 1955, and reference may be had thereto for details of structure and operation. It suffices herein merely to describe this apparatus in general terms by reference to Fig. 3 wherein the apparatus is disclosed in block diagram form. Pulses of the desired frequency and duration, preferably of the order of less than 10 milliseconds, are generated in the pulse generator 30 which comprises an oscillator, a pulse forming section, a mixer stage, and an amplifier. In order to assure as stable an operating frequency as possible, a free running oscillator is employed whose frequency is determined by a crystal operating at the desired low frequency in the aural spectrum. A pulse of rectangular shape is generated in the pulse forming section, and the length of this pulse is made dependent upon the selection of the proper time constants. The pulse and the oscillator frequency are mixed together in the mixer stage which comprises a tube having several grids, the oscillator output being applied to one of the grids and the pulse to another. No signal output appears at the plate of this stage until the preformed pulse unblocks the tube. The pulse merely opens and closes a "gate." The output is then amplified to a suitable level to drive the high-power amplifier 31. Pulse generator 30 may be of any type suitable for the purpose such, for example, as that disclosed and claimed in the copending patent application of Louis R. Padberg, Jr., et al., for High Power Short Pulse Transmitting Apparatus, Serial No. 504,391, filed April 27, 1955.

Power amplifier 31 comprises a pair of beam power tubes and four high power tetrodes connected in a push-pull parallel circuit operated as a class B power amplifier. It is capable of delivering upwards of 100 kilowatts of pulse power to a low impedance projector. All circuit components are specially constructed for high power application since conventional equipment has not been developed to withstand powers of this order. The power supply employed for the purpose at a potential of the order of 15,000 volts has a large bank of high voltage capacitors for energy storage in order to keep the pulse decay to a minimum.

Pulses from amplifier 31 are passed via the transmit-receive relay 32 to the high-power projector-receiver 33. The transmit-receiver relay is a multi-pole relay capable of withstanding high voltages and currents. The relay is not required when separate transducers are employed for the transmitting and receiving functions of the projector-receiver 33. When relay 32 is in its transmit position the projector-receiver is connected to amplifier 31 and when the relay is in its receive position the projector-receiver 33 is connected to the receiver 34.

The projector-receiver 33 is of the magneto-strictive type and therefore capable of withstanding very high power upwards of 100 kilowatts without electrical breakdown. Structurally the unit comprises approximately 46,000 thin laminations of pure nickel, each formed in a particular predetermined shape. The laminations are wound with a few turns of wire capable of withstanding approximately 25,000 volts R. M. S. while immersed in salt water. No diaphragm is used, the laminations themselves being in direct contact with the sea water and the windings being free-flooded with the sea water for cooling. The projector is further characterized by low impedance, is preferably resonant at 15 kilocycles or lower, and uses external polarization. Projector 33 may be of any type suitable for the purpose such, for example, as that disclosed and claimed in the copending patent application of Louis R. Padberg, Jr. for High Power Acoustic Transducer, Serial No. 503,842, filed April 25, 1955.

The receiver 34 employs simple filters, embodies the conventional superheterodyne principle, and is for the most part conventional. Certain electronic circuits are incorporated, however, which are not conventional and greatly add to the enhancement of the visual and aural displays hereinafter to be described. Since the ear does not respond well to very short pulses of sound, the receiver includes means which add tone to the conventional "clicks." The receiver also includes a time varied gain circuit which gives the operator a very flexible control over the receiver gain so as to prevent blocking on very close signals. Receiver 34 is disclosed and claimed in the aforementioned copending patent application for Improved Echo Ranging System, Serial No. 504,390, filed April 27, 1955.

The output of receiver 34 is electrically connected to several different instruments including the recorder 35, speaker 36 and oscilloscope 37 which has a camera attachment 38 for photographing the echo return displayed on the screen of the cathode ray tube of the oscilloscope.

The receiver output varies in voltage with variations in the intensity of the returning echoes and thus the recorder 35 may be of any suitable type adapted to leave a line trace which varies in intensity in accordance with the voltage of the received signal. The preferred apparatus as employed in the system of Fig. 3, however, is specially designed to give very high resolution, the echoes produced being presented, as illustrated in Figs. 4, 4a, and 5, in the form of dots on a chemically treated recording paper, portions of which are depicted in these figures. One or more styli begin their movement across the recording paper in synchronism with the outgoing pulse. Each sweep of the styli across the paper leaves a line trace of variable intensity in accordance with the intensity of the echoes received for a particular pulse, such line traces being indicated, for example, at 39—40, 41—42, and 43—44 in Figs. 4, 4a, and 5 respectively.

As the line traces are produced in successive order, line-after-line upon movement of the recording paper past the styli, the variations in intensity of the line traces together leave contour lines such, for example, as the contour line traced by the numerals 45—46—47 in Fig. 4 which depicts the ocean bottom and the contour line 48—49—50, also in Fig. 4, which depicts the bottom of the sediment layer bounded between these contour lines. In the showing of Fig. 4, the range scale of the recorder was set at a scale of 0–3000 feet across the recorder paper and thus, a measure of the thickness of the sediment layer is taken directly from the record as approximately 500–600 feet thick.

While it is possible to use conventional sound recording paper such as is used in echo sounders, a chemically treated paper is used because it has a greater dynamic range and thus provides a wide range of varying shades of black and gray which, it should be appreciated, cannot be reproduced in the simulated recordings as illustrated diagrammatically by the series of inked lines in Figs. 4, 4a and 5.

Figure 3:
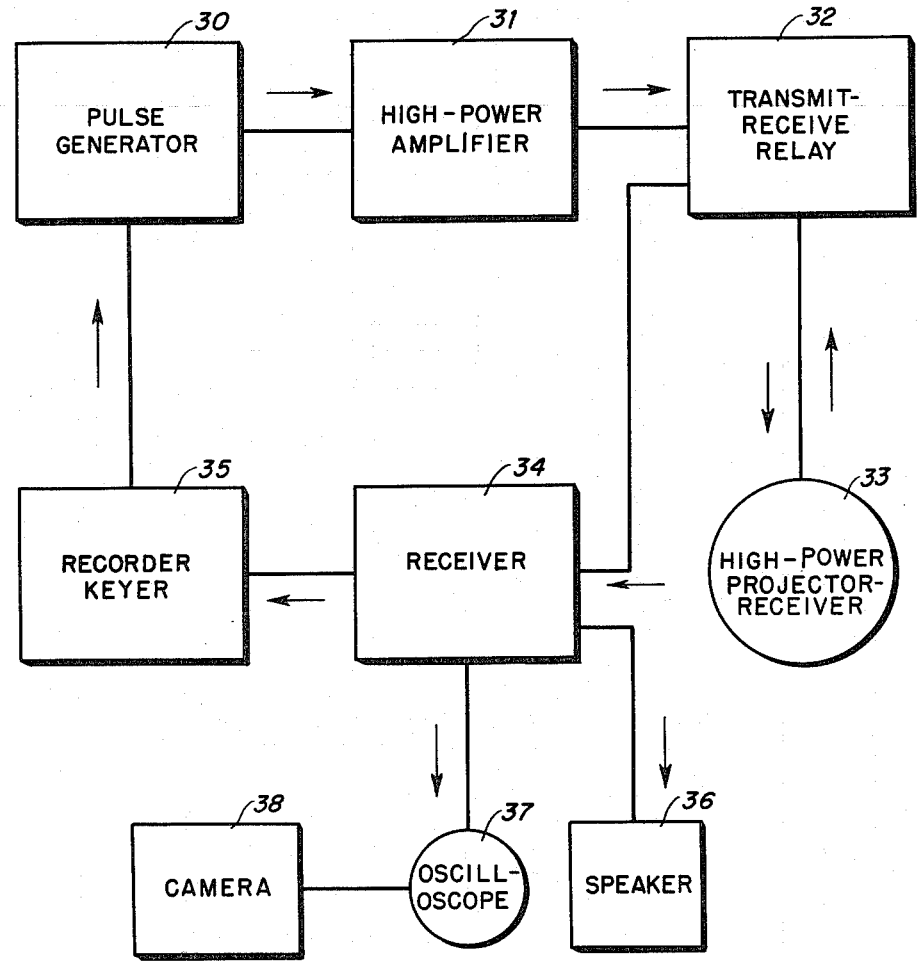
Fig. 3 is a diagrammatic view in block form of apparatus suitable for use in practicing the method of the present invention.

In addition to portraying the returning echoes, the recorder also performs the function of triggering the outgoing pulse, note the upwardly directed arrow from the recorder-keyer, Fig. 3. This is accomplished by a suitable arrangement of cams and switches. Recorder 35 may be of any type suitable for the purpose such, for example, as that disclosed and claimed in the copending patent application of Frederick D. Parker and Louis R. Padberg, Jr. for Echo Ranging Recording Apparatus, Serial No. 493,586, filed March 10, 1955.

Each individual sweep of the styli of recorder 35 is accompanied by an aural presentation of the returning echoes from speaker 36 and an "A" scan presentation of the echoes on the face of the cathode-ray tube comprising oscilloscope 37. An oscillogram, such as may be obtained from the oscilloscope 37 and camera 38, is illustrated in Fig. 6 and corresponds to the line trace 41—42 of Fig. 4a.

It will be noted that a series of indicia marks, such as those designated 51 to 59 in Figs. 4, 4a, and 5, appear at the lower edge portion of the recording paper. These provide minute time datum points or marks for correlation of the line trace variations with the position or location of the vessel at the time a particular series of echoes are received from a transmitted pulse, the speeds of the recording paper and of the vessel being known in addition to the course and time of traverse of the vessel. The recording paper is also marked by the operator to indicate the time of day thereon from time to time as indicated, for example, in Fig. 4a wherein there appears the notation 1322 from which it may readily be determined that the trace 41—42 was recorded at 1325 or 1:25 o'clock.

Referring now more particularly to Figs. 4a and 6, it will be noted that the range scale is 0–9000 feet and the bottom, indicated at 60 in Fig. 4a and at 61 in Fig. 6, is approximately 1800 feet below the water surface. Also indicated in these figures are strata which are approximately 1500 feet below the ocean bottom, this strata appearing at 62 in Fig. 4a and indicated at 63 in Fig. 6. The subsurface layer effect indicated by the dark trace area designated 62, as aforementioned, is not a bottom multiple. Assuming the same velocity for the sound as was obtained in water, this source of reflection measures about 1500 feet below the bottom. In all probability the velocity would be much greater since the material is more dense. Until the material is cored, the velocity can only be assumed. This provides evidence and proof of penetration of the ocean floor.

Referring now more particularly to Fig. 5, the ocean bottom may be traced by the numerals 64—65—66—67. Shortly after 1306 the bottom takes a pronounced drop such as one would find at an escarpment. This is the edge of the continental shelf at a location known as the Coronado Bank which lies southwest of Point Loma, San Diego, California. The bottom drops down to about 2100 feet deep at this spot. At the foot of this escarpment there may be seen a huge sedimentary deposit varying in thickness up to about 600 feet, or more, and may be traced to the right in Fig. 5 starting with the designation 68.

The location and measuring of the thickness of the sedimentary deposits is an important feature of the present invention and is of prime importance in geophysical prospecting since the deposits are very ancient and contain a vast quantity of mineral wealth, probably the largest untapped source on earth. These minerals have been washed down from the highest points on earth and come to rest on the edges of the continental shelves. Conventional echo sounding equipment does not have sufficient source level to penetrate such a mass, and depth measuring instruments are unable to produce an almost third dimensional portrayal such as is depicted of the escarpment in Fig. 5.

It will be noted in each of Figs. 4, 4a and 5 that there appears a dark trace at the top edge portion of the recording paper which is due to surface reverberations. Other variations in the traces depict such things as scattering layers in the sea water and various earth materials and structures beneath the ocean floor. However, further description of the simulated records is not given for the reason that the simulation of the actual records for patent purposes, as herein disclosed, does not provide the same adequate detail and resolution as is afforded in the actual record.

From the foregoing, it should now be appreciated that a subsurface exploration method has been provided in which a wide traverse over an ocean course may be covered in a short period of time as is the case, for example, when the vessel travels at a speed of 6 knots which has been found to be satisfactory. Moreover, the repetitive character of the sonic sounding and manner of recording not only expedites the speed of operation but also produces a permanent record which may be read directly without further analysis of the data depicted thereon.

Figure 2:
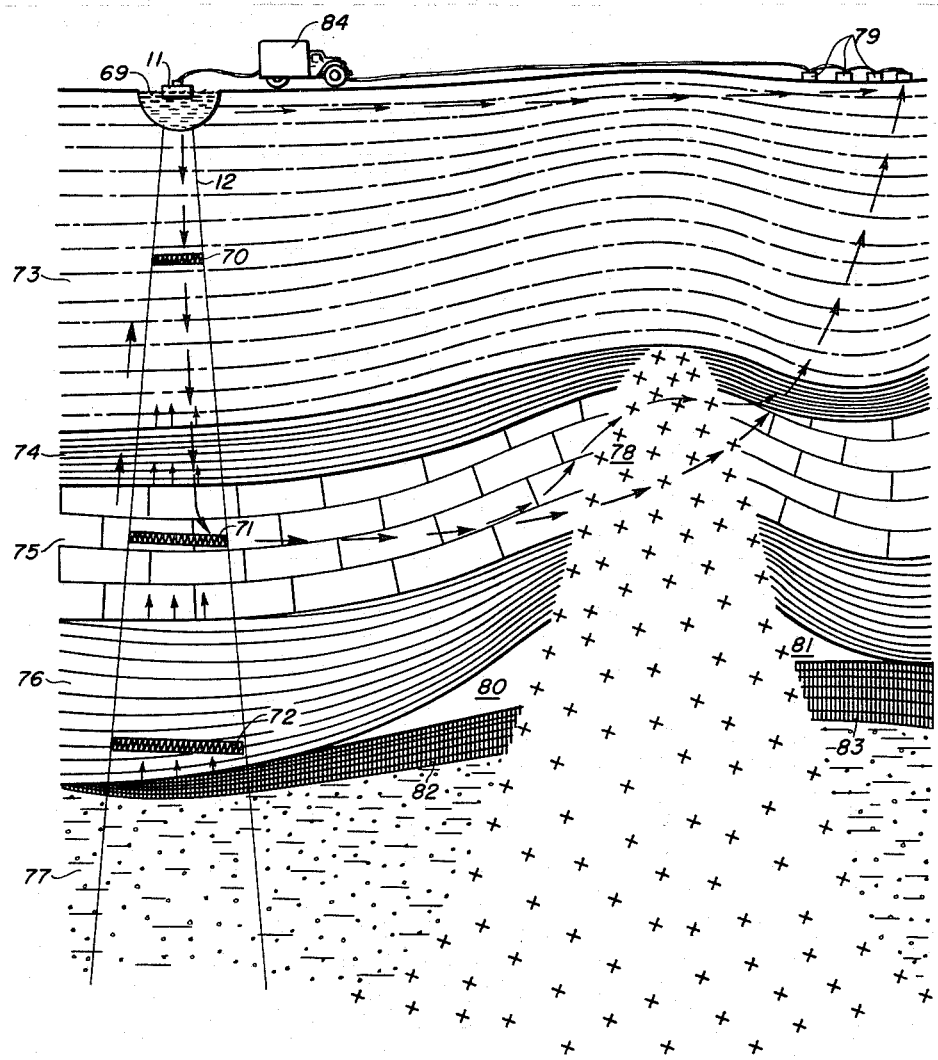
Fig. 2 is a diagrammatic view portraying the manner of practicing the method of the present invention over a land area.

In Fig. 2 there is disclosed apparatus suitable for practicing the subsurface exploration method of the present invention over a land surface of the earth. In this case, the projector-receiver 11 preferably is coupled to the earth by way of the body of fluid 69. A vertically directed pulse from the projector-receiver, depicted in the successive positions of penetration as at 70, 71, and 72, passes in succession through layers of overburden or soil 73, shale 74, limestone 75, shale 76, and salt water 77. The echoes reflected from these strata or layers are indicated by the upwardly directed arrows. The refracted sound is indicated by the horizontally directed arrows which pass through the sale dome 78 and reach the geophone array 79.

The structural formation illustrated in Fig. 2 is usually favorable to the formation of petroleum products and gas pockets such as indicated at 80 and 81, and oil beds as indicated at 82 and 83 are usually found to be associated therewith.

The echoes picked up by the projector-receiver 11 and by the geophone array 79 are timed and recorded by equipment similar to that disclosed in Fig. 3, this equipment being carried by the truck 84 or other suitable mobile means.

Obviously many modifications and variations of the present invention are possible in the light of the above teachings. It is therefore to be understood that within the scope of the appended claims the invention may be practiced otherwise than as specifically described.

What is claimed is:

1. A sonic method of subsurface exploration which comprises the steps of projecting high power, low frequency, short pulses of acoustic energy in a narrow beam into the substructure below the subsurface of the earth, said pulses having a frequency within the aural spectrum and an energy level approaching the energy level of explosives and a pulse duration of the order of less than ten milliseconds, and measuring the depth of pulse penetration by accurate timing of returned echoes.

2. A sonic method of subsurface exploration which comprises the steps of generating high power, low frequency, short pulses of acoustic energy within the aural spectrum and of less than ten milliseconds duration, projecting said pulses vertically into the subsurface of the earth in a narrow beam, and at a power level approaching that of explosives and measuring the depth of pulse penetration by accurate timing of returned echoes.

3. A sonic method of subsurface exploration which comprises the steps of generating short pulses of acoustic energy of the order of less than ten milliseconds duration at a level approaching the energy level of explosives and at a single discrete frequency in the aural spectrum, projecting said pulses vertically into the subsurface of the earth in a narrow beam, and measuring the depth of pulse penetration in terms of the lapse of time between pulse projection and the return of echoes resulting therefrom.

4. A sonic method of subsurface exploration which comprises the steps of generating high power short pulses of acoustic energy of the order of less than ten milliseconds duration and at a single discrete predetermined frequency in the aural spectrum, projecting said pulses in a concentrated beam vertically into the subsurface of the earth at a power level approaching that of explosives and at a predetermined repetition rate, and measuring the depth of pulse penetration by the lapse of time between pulse projection and the return of echoes resulting therefrom.

5. A sonic method of subsurface exploration which comprises the steps of generating low frequency short pulses of acoustic energy at a frequency within the aural spectrum, with a duration of the order of less than ten milliseconds, and at a level approaching the energy level of explosives employed for geophysical prospecting, projecting a concentrated beam of said pulses vertically with predetermined directivity for penetration of the subsurface structures of the earth, and measuring the depth of pulse penetration by the lapse of time between the pulse projection and the return of echoes resulting therefrom.

6. An exploration method by sonic means of the character disclosed which comprises the steps of projecting and directing high power, low frequency, short pulses of sonic energy in a concentrated beam vertically into the substructure of the earth, said pulses having a frequency within the aural spectrum and sufficiently low to minimize transmission losses of pulse penetration through said substructure, said pulses having a power level of the order of that obtainable from explosives and sufficiently high level for pulse penetration at said frequency to depths of interest into said substructure, said pulses having a pulse duration of the order of less than ten milliseconds and sufficiently short to avoid cavitation at said power level, said beam being sufficiently concentrated for sonic illumination of targets at said depths of interest, and measuring and recording the depth of penetration of the pulses in terms of the lapse of time between the projection thereof and the return of echoes resulting therefrom.

7. An exploration method by sonic means of the character disclosed which comprises the steps of transmitting beamed energy in high power, low frequency, short pulses for penetration below the earth's crust via a liquid coupling medium, said pulses having a frequency within the aural spectrum and sufficiently low to minimize transmission losses of said pulse penetration below the earth's crust, said pulses having a power level of the order of that obtainable from explosives and sufficiently high to obtain said penetration to depths of interest at said frequency, said pulses having a duration of the order of less than ten milliseconds and sufficiently short to avoid cavitation at said power level, and measuring and recording data indicative of the geological character of the subsurface in terms of the lapse of time between the projection of each of said pulses and the return of echoes resulting therefrom.

8. A subsurface exploration method by sonic means comprising the steps of projecting high power level, short duration, low frequency pulses of acoustic energy vertically in a narrow directed beam into the earth from a mobile device upon movement thereof along a predetermined traverse, said pulses having a frequency within the aural spectrum, a power level of the order of that obtainable from explosives, and a pulse duration of the order of less than ten milliseconds, and measuring and recording variations in the time of return of echoes resulting from said pulses and reflected from said geological structures within the earth thereby to provide a permanent record in profile of the contours of the structures disposed along said traverse.

9. The sonic method of conducting subsurface explorations from a moving vessel over a predetermined oceanic course comprising the steps of projecting and directing high power level, short duration, low frequency pulses of beamed acoustic energy vertically into the water repetitively as the vessel moves over the course, said pulses having a frequency within the aural spectrum, a power level of the order of that obtainable from explosives, and a pulse duration of the order of less than ten milliseconds, and producing a series of line traces individual respectively to said pulses and each of variable intensity in accordance with variations in the intensity of the echoes resulting from each pulse and reflected from said subsurface strata penetrated thereby whereby variations in intensity of the line traces from line to line appear as contour lines of said strata.

10. The sonic method of conducting subsurface explorations from a vessel moving along a predetermined course over a body of water comprising the steps of generating high power level, short duration, low frequency pulses of acoustic energy on said vessel, projecting and directing said pulses from said vessel vertically into the water in a narrow conical beam for successive penetration of the subsurface structures to great depth as the vessel moves along said course, said pulses having a frequency within the aural spectrum, a power level of the order of that obtainable from explosives, and a pulse duration of the order of less than ten milliseconds, receiving echoes resulting from each of said pulses and reflected in successive order from said subsurface structures as penetration of each pulse progresses therethrough, producing a line trace for the echoes from each of said pulses which varies in intensity with the intensity of the echoes received for each pulse, and recording each successive trace in closely spaced parallel relation to the trace next preceding thereto whereby variations in intensity of the line traces from line to line appear as contour lines of said subsurface structures.

11. A sonic method of subsurface exploration which comprises the steps of moving a vessel along a predetermined course over a body of water, generating high power level, short duration, low frequency pulses of acoustic energy on the vessel, projecting and directing said pulses from said vessel vertically into the water in a narrow concentrated beam for successive penetration of the subsurface structures to great depth as the vessel moves along said course, said pulses having a frequency within the aural spectrum, a power level of the order of that obtainable from explosives, and a pulse duration of the order of less than ten milliseconds, adjusting the repetition rate of said pulses in accordance with the depth of penetration desired, receiving echoes resulting from each of said pulses and reflected in successive order from said subsurface structures as penetration of each pulse progresses therethrough, recording the echoes for each said pulse as a line trace which varies in intensity in accordance with the intensity of the echoes, and recording each successive trace in closely spaced parallel relation to the trace next preceding thereto whereby the variations in intensity from line to line appear as contour lines of the subsurface structures.

12. A sonic method of subsurface exploration which comprises the steps of moving a vessel along a predetermined course over a body of water, repetitively transmitting and directing high power level, short duration, low frequency pulses of acoustic energy vertically into the water from said vessel and in a narrow concentrated beam for successive penetration of the subsurface structures as the vessel moves along said course, said pulses having a frequency within the aural spectrum, a power level of the order of that obtainable from explosives, and a pulse duration of the order of less than ten milliseconds, receiving echoes resulting from each of said pulses and reflected in successive order from said subsurface structures as penetration of each pulse progresses therethrough, recording the echoes for each said pulse as a line trace which varies in intensity in accordance with the intensity of the echoes received, presenting concurrently with the recording of each said line trace an aural display of the echoes received for each said pulse, presenting concurrently with each said line trace and each said aural display an "A" scan cathode-ray display of the echoes received for each said pulse, recording each successive line trace in closely spaced parallel relation to the line trace next preceding thereto whereby the variations in intensity from line to line appear as contour lines of the subsurface structures, marking the line trace record with a series of datum points for space correlation of said line traces with successive locations along said traverse, photographing said "A" scan presentation at selected intervals, and marking said photographs for identification with said line traces respectively corresponding thereto.

13. A sonic method of subsurface exploration which comprises the steps of projecting and directing high power level, short duration, low frequency pulses of beamed acoustic energy vertically into the earth for successive penetration of the subsurface structures thereof to great depth, said pulses having a frequency within the aural spectrum, a power level of the order of that obtainable from explosives, and a pulse duration of the order of less than ten milliseconds, receiving the echoes resulting from each said pulse and reflected in successive order from said structures as the penetration of each said pulse progresses therethrough, producing a series of successive straight line traces which develop respectively during successive intervals between said pulses, varying the intensity of each of said traces in accordance with the echoes concurrently received therewith as the development of each said trace progresses, and recording each successive trace in closely spaced parallel relation to the trace next preceding thereto whereby the variations in the intensity of the line traces from line to line appear as contours of the subsurface structures when the pulses are directed to penetrate the earth in successive positions along a traverse thereover.

14. A sonic method of subsurface exploration which comprises the steps of projecting and directing high power level, short duration, low frequency pulses of beamed acoustic energy vertically into the earth for successive penetration of the subsurface structures to great depth, said pulses having a frequency within the aural spectrum, a power level of the order of that obtainable from explosives, and a pulse duration of the order of less than ten milliseconds, receiving energy from each of said pulses which is reflected upwardly from said structures, receiving at points remote from the pulse projecting site energy from each of said pulses which reaches said points by refraction through said subsurface structures, and measuring the depth of penetration and the character of said subsurface structures by the lapse of time between the projection of said pulses and the return of said reflected and refracted energy therefrom.

15. Apparatus of the character disclosed for conducting subsurface explorations by sonic means comprising, in combination, means including a high power sonic projector adapted for fluid coupling to the earth for transmitting and directing vertically in a narrow beam into the earth high power, low frequency, short duration pulses of acoustic energy, said pulses having a frequency within the aural spectrum, a power level of the order of that obtainable from explosives, and a pulse duration of the order of less than ten milliseconds, and means for receiving and separately recording the intensity variations of the echoes resulting from each pulse and reflected in successive order from successive strata beneath the earth's surface as penetration of the pulse progresses therethrough.

16. Apparatus of the character disclosed for conducting subsurface surveys by sonic means comprising, in combination, means for transmitting and directing high power, low frequency, short pulses of acoustic energy vertically in a narrow beam into the subsurface of the earth and repetitively as the apparatus is moved along a predetermined traverse over the earth's surface, said pulses having a frequency within the aural spectrum, a power level of the order of that obtainable from explosives, and a pulse duration of the order of less than ten milliseconds, and means for receiving and recording the echoes resulting from each of the pulses and reflected in successive order from successive strata beneath the earth's surface as each said pulse progressively penetrates therethrough.

17. A repetitive method of sonic exploration of the subsurface of the earth comprising the steps of projecting a high power short pulse of low discrete frequency vertically into the earth's subsurface to depths of the order of thousands of feet, said pulse having a length of the order of less than 10 milliseconds, a frequency of the order of less than 15 kilocycles, power level of the order of upwards of 100 kilowatts, and a narrow conical beam having a projection angle of the order of 15°, and measuring and recording the depth of penetration of the pulse in terms of the lapse of time between the projection thereof and the return of the echoes resulting therefrom.

18. A sonic method of pulse penetration into the substructure of the earth to depths of interest therein of the order of thousands of feet comprising the steps of repetitively forming an electrical pulse of high power level, short duration, and low frequency, converting said electrical pulse to a sonic pulse, fluid coupling said sonic pulse to said substructure, projecting and directing said sonic pulse in a concentrated beam into said fluid coupling, and measuring the depth of pulse penetration into said substructure by the lapse of time between projecting of said sonic pulse and return of echoes resulting therefrom, said sonic pulse having a frequency within the aural spectrum and sufficiently low to minimize pulse transmission losses which increase with increased frequency, said sonic pulse having a power level comparable to that obtainable from explosives and sufficiently high for obtaining pulse penetration to said depths at said frequency, and said sonic pulse having a duration of the order of less than ten milliseconds and sufficiently short to avoid cavitation with said beam area and at said power level.

19. A sonic method of subsurface exploration comprising the steps of generating short pulses of acoustic energy at a level approaching the energy level of explosives and at a frequency in the aural spectrum and with a pulse duration of the order of less than ten milliseconds, projecting said pulses vertically into the earth in a narrow beam, and measuring the depths of pulse penetration in terms of lapse of time between pulse projection and the return of echoes resulting therefrom.

References Cited in the file of this patent

UNITED STATES PATENTS

| | | |
|---|---|---|
| 2,253,975 | Gaunella | Aug. 26, 1941 |
| 2,354,548 | Ricker | July 25, 1944 |
| 2,364,209 | Green | Dec. 5, 1944 |
| 2,436,377 | Briggs | Feb. 24, 1948 |
| 2,440,971 | Palmer | May 4, 1948 |
| 2,463,328 | Sproule | Mar. 1, 1949 |
| 2,599,586 | Ross | June 10, 1952 |
| 2,651,027 | Vogel | Sept. 1, 1953 |

OTHER REFERENCES

An article entitled, Echo Depth Sounders, in the September 1946, issue of Electronics, pages 88–92.

Jakosky: "Frequency Analysis of Seismic Waves," Geophysics, vol. 17, No. 4, October 1952, pages 721–738 (pages 722–726 relied on).